United States Patent [19]

Rains et al.

[11] 4,169,272
[45] Sep. 25, 1979

[54] APPARATUS FOR SIMULATING A PERSPECTIVE VIEW OF A VIDEO IMAGE AND FOR STORING SUCH IMAGE WITH A MINIMUM NUMBER OF BITS

[75] Inventors: Lyle V. Rains, San Jose; Stephen D. Bristow, Los Altos Hills; David M. Shepperd, Santa Clara, all of Calif.

[73] Assignee: Atari, Inc., Sunnyvale, Calif.

[21] Appl. No.: 868,932

[22] Filed: Jan. 12, 1978

[51] Int. Cl.² .......................................... H04N 3/22
[52] U.S. Cl. .............................. 358/180; 35/11 R; 35/12 N; 358/1; 358/81; 358/104
[58] Field of Search ................... 358/180, 81, 104; 35/11 R, 12 N

[56] References Cited
U.S. PATENT DOCUMENTS 3,833,759  9/1974  Yatabe ............................. 35/11 R
3,911,597  10/1975  Millard ............................ 35/12 N Primary Examiner—Howard W. Britton
Attorney, Agent, or Firm—Townsend and Townsend

[57] ABSTRACT

A simulated perspective view of a landscape is provided on a video display screen used, for example in a video game where a player by means of manual control seeks out various moving targets on the landscape. Specifically, the perspective is achieved by converging the landscape toward the top of the display screen. This is done from a vertical standpoint by distorting in a concave manner the vertical drive voltage. From a horizontal line standpoint a change of horizontal line length is accomplished by a voltage controlled oscillator which has an output frequency which controls readout of video display data. In addition, each line of the specific image is formed by segments and defined by binary bytes to specify either color or level of gray in one portion and the length of the segment in the other.

11 Claims, 9 Drawing Figures

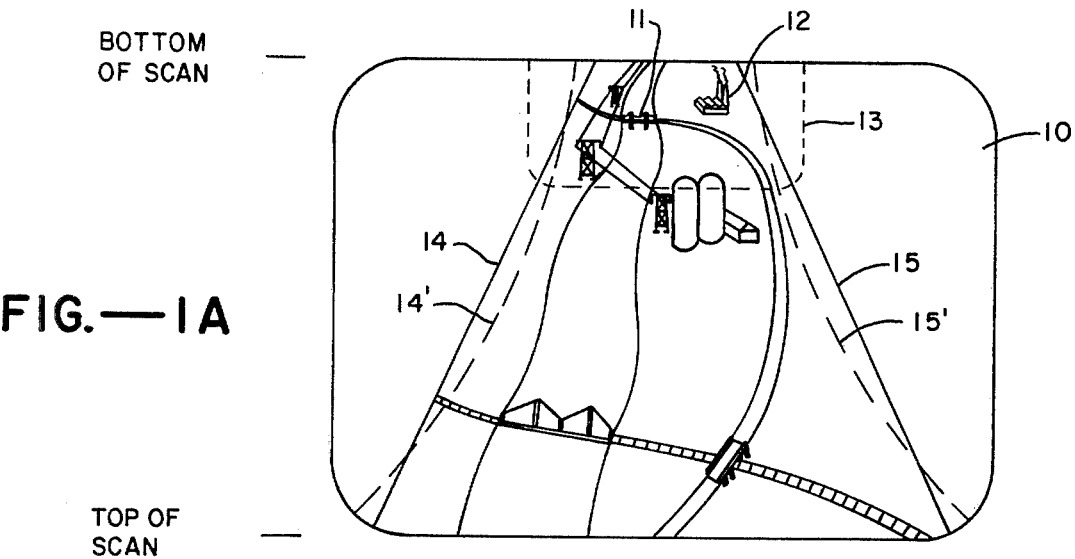
FIG.—1A
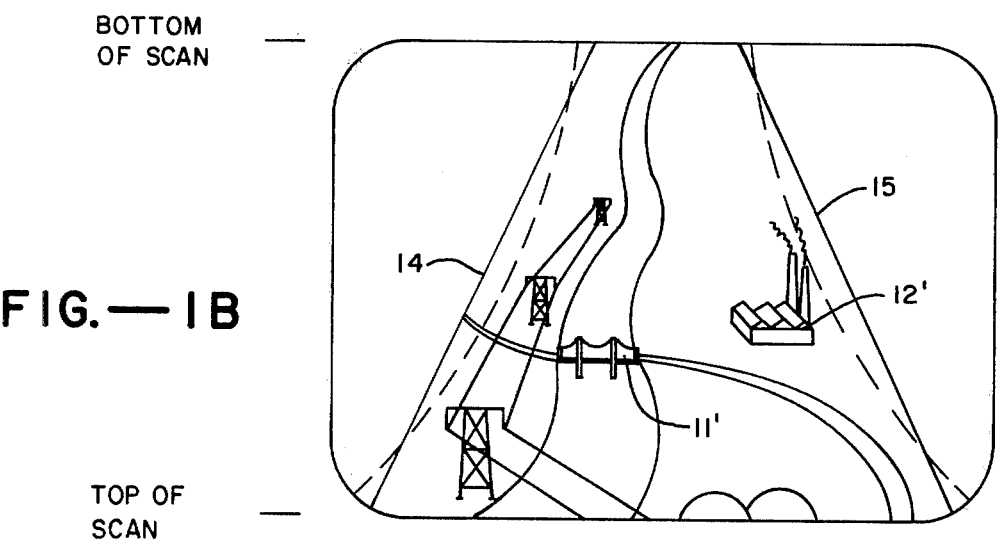
FIG.—1B
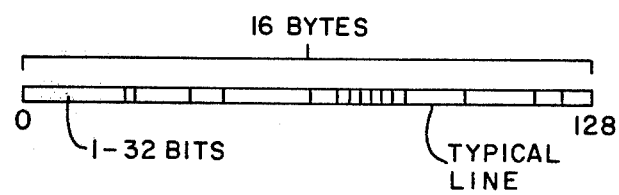
FIG.—1C
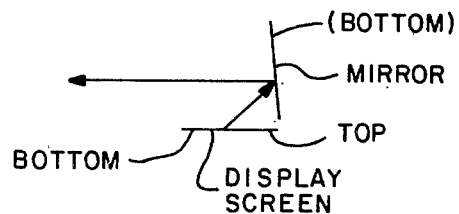
FIG.—1D

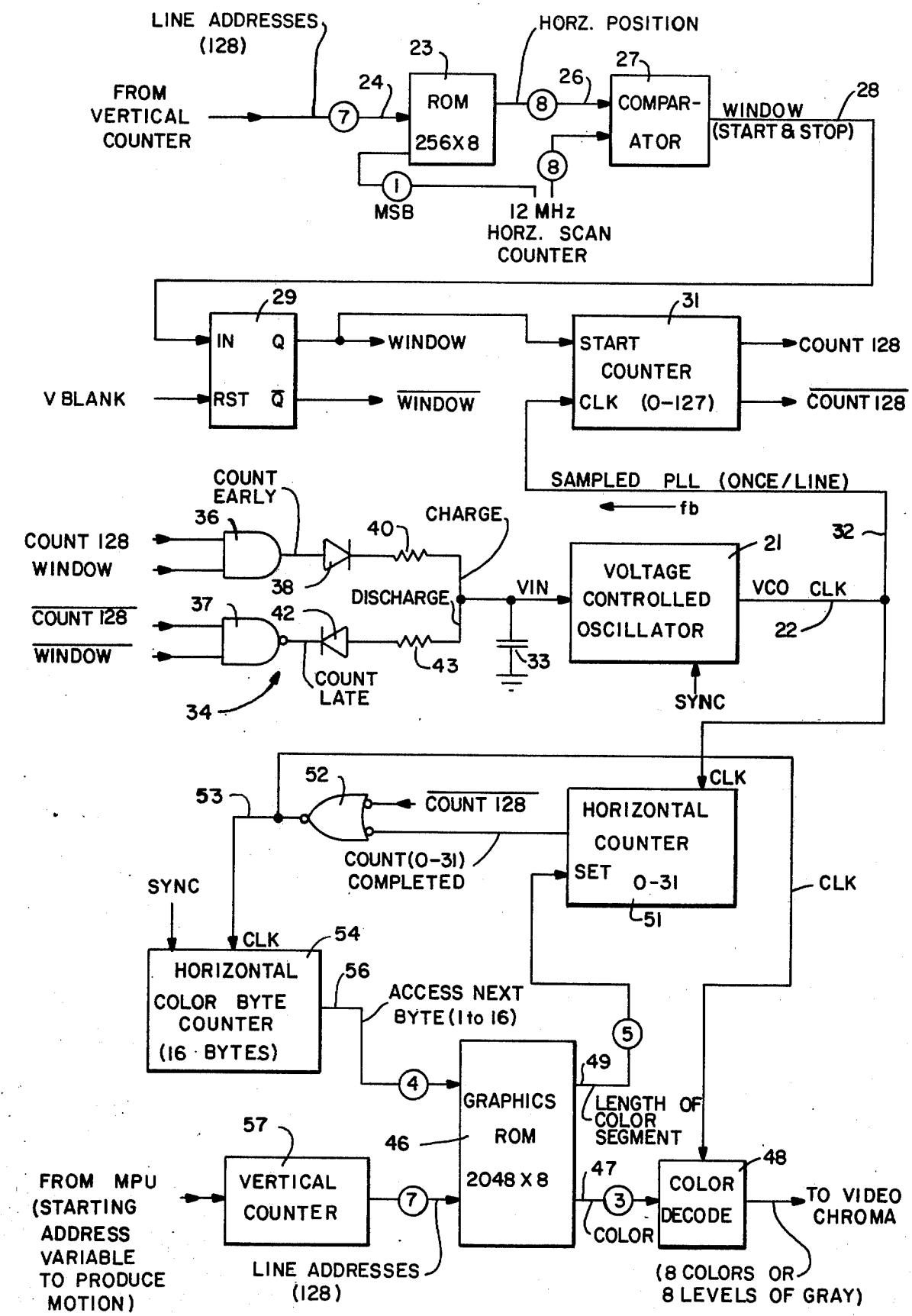
FIG. —2

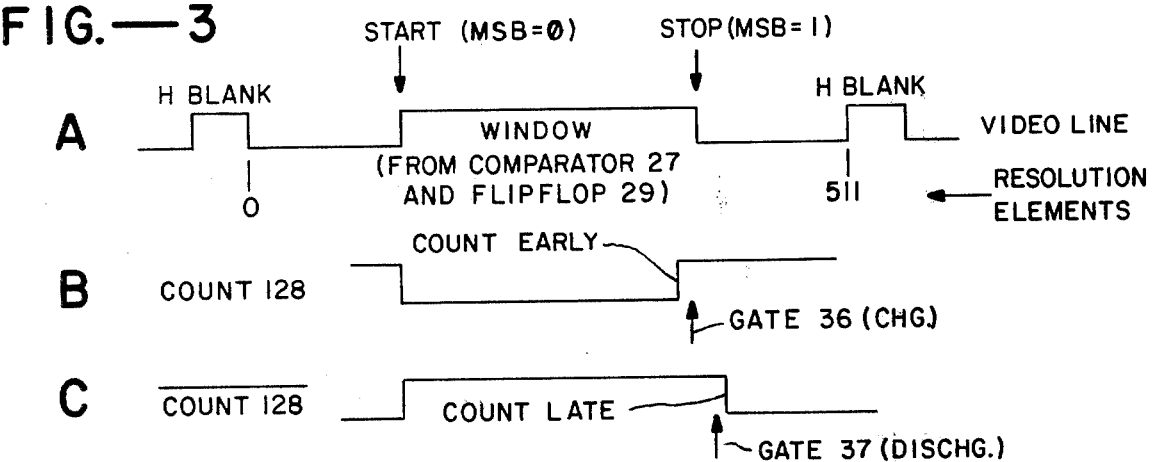
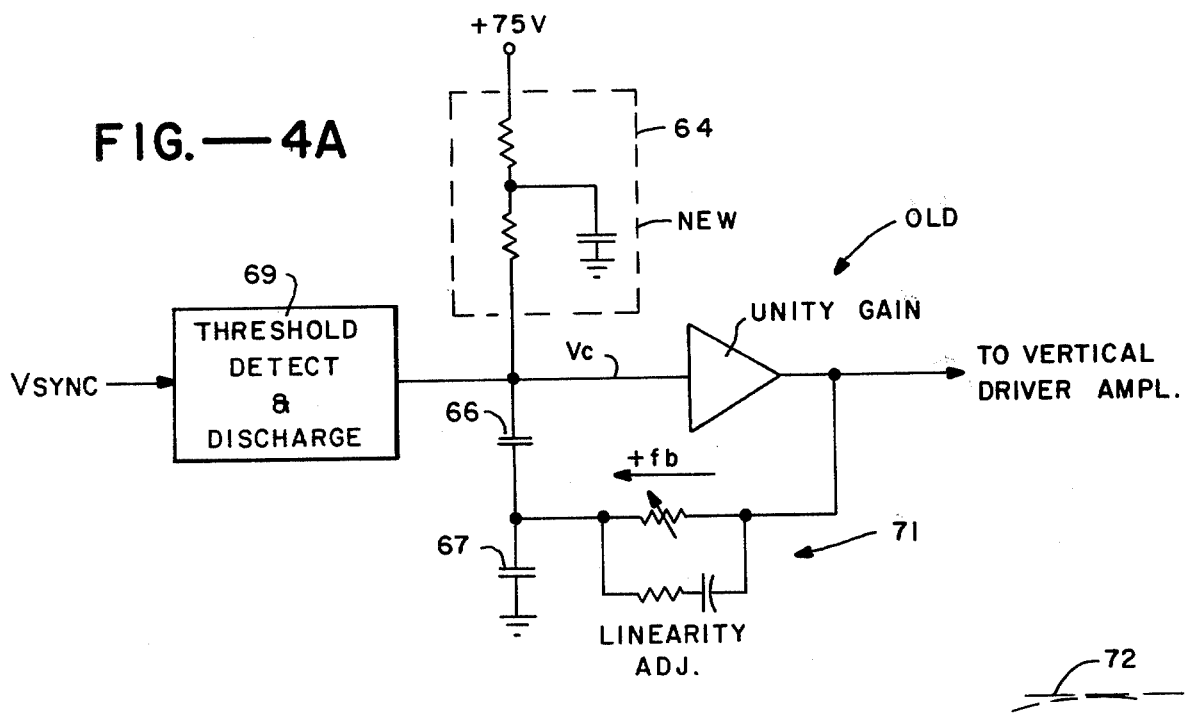
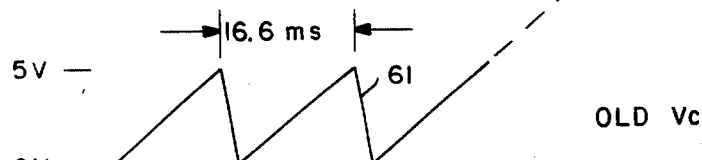
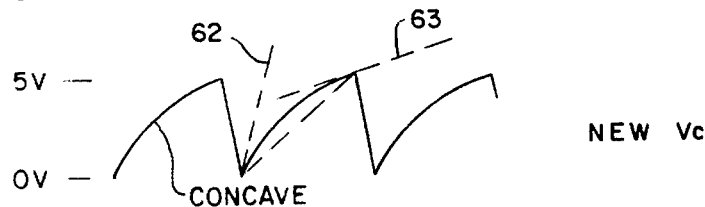

APPARATUS FOR SIMULATING A PERSPECTIVE VIEW OF A VIDEO IMAGE AND FOR STORING SUCH IMAGE WITH A MINIMUM NUMBER OF BITS

BACKGROUND OF THE INVENTION

The present invention is directed to apparatus for simulating a perspective view of a video image and for storing such image with a minimum number of bits.

In the past, the production of a perspective view, for example, of a landscape that might be used in a game where various targets such as bridges and farmhouses would be "shot at" by player has been produced by mechanical means. Where a video display is used there has been a lack of realism.

Furthermore, the generation of a video landscape which extends over substantially the entire display screen has required a prohibitive amount of digital storage.

OBJECTS AND SUMMARY OF THE INVENTION

It is, therefore, an object of the present invention to provide improved apparatus for simulating a perspective view of a video image.

It is another object of the present invention to provide apparatus for generating a video image which is provided with a minimum of digital data.

In accordance with the above objects there is provided apparatus for simulating a perspective view of an image composed of several horizontal lines on a raster scan type video display screen, such screen having top and bottom ends. Means are provided for gradually reducing the line width of each horizontal line of the image from one end of the image to the other end. In addition, the spacing between each horizontal line of the image is gradually reduced from one end of the image to the other end.

From another aspect memory means provide a predetermined number of data bits for each line of the image. Such means store a predetermined number of bytes representing a line segment; each byte includes coded binary data with one portion indicating the color or gray scale of such segment and the other portion the length of the segment. The total of said lengths is equivalent to the predetermined number of data bits.

BRIEF DESCRIPTION OF THE DRAWINGS

FIGS. 1A and 1B are plan views of video images illustrating the present invention;

FIG. 1C is a diagrammatic view of a single horizontal line of the image of FIG. 1B;

FIG. 1D is a simplified elevational cross-sectional view illustrating the physical positioning of the video display screen;

FIG. 2 is a block circuit diagram embodying the present invention;

FIG. 3 is a timing diagram useful for understanding the operation of FIG. 2;

FIG. 4A is vertical drive circuitry for a television receiver embodying the present invention; and FIGS. 4B and 4C are waveforms useful in understanding the operation of FIG. 4A.

DETAILED DESCRIPTION OF THE PREFERRED EMBODIMENTS

Typical video images and the sequential relationship between the two are shown on video display screen 10 in FIGS. 1A and 1B, the latter figure being later in time sequence. These video images are used in a game termed "SKY RAIDER" (trademark) where the player by means of manual control inputs flies over the video playfield or landscape seeking to bomb targets such as bridge 11 and factory 12. These are contained within a dashed outline 13 and in accordance with the operation of the video game the entire image moves from the top of the screen to the bottom being enlarged in size both in horizontal and vertical dimensions as illustrated in FIG. 1B by the now enlarged bridge 11' and the factory 12'.

A simulated perspective effect is provided since the sides or boundaries of the video image are constituted by the converging lines 14 and 15. The curved dashed lines 14' and 15' coextensive with the straight perspective lines illustrates distortion, corrected by the present invention, which will be discussed below.

From a practical standpoint the video image of FIG. 1B is actually an inverted image with the start of the video frame scan at the bottom and the finish of the frame at the top as so indicated. This inversion is accomplished as illustrated in FIG. 1D by the use of a mirror. This mirroring is not necessary for this invention, but is due to its packaging; for example, if more depth were available for the game cabinet a direct view of an inverted video display could be used.

A change in the horizontal size of an object 11' or 12' is accomplished by the use of a voltage controlled oscillator which when varied in frequency changes the line width. A typical line is illustrated in FIG. 1C which consists of 128 data bits. All lines have the identical number of data bits but by use of the voltage controlled oscillator are read out at a different rate to thus cause a change in the width of each line. Specifically by varying the readout of the 128 data bits the line is made shorter for a faster readout and longer for slower readout. Thus, the lengths of the resolution elements are effectively varied. Such technique is shown in general in a copending application entitled "Apparatus For Continuous Variation of Object Size on a Raster Type Screen," in the names of Mayer and Milner, Ser. No. 809,314, filed June 23, 1977, and assigned to the present assignee. Still referring to FIG. 1C in a typical line the 128 active video data bits consist of different segments of different color of from 1 to 32 bits in length. Each segment is formed by a stored data byte as will be discussed in detail below. This technique is used for the general landscape or terrain. For more detailed resolution (needed for the bridge 11 and factory 12) the VCO 21 controls graphics circuitry (not shown) as illustrated by the graphics generator of the Mayer/Milner copending application where a line of an object has every resolution element stored in memory. When a detailed object is to be displayed the terrain video is made "black" and the resulting "hole" filled by the target object.

Referring now to FIG. 2, a voltage controlled oscillator 21 produces a VCO clock signal on line 22 which is variable to effectively control the horizontal line width of the video image. One technique of control of the voltage controlled oscillator 21 is illustrated in the above copending Mayer/Milner application. The specific circuitry of the voltage controlled oscillator of the present invention is shown in another copending application in the name of David Stubben entitled "Low Cost, Wide Range Voltage Controlled Oscillator," filed Dec. 16, 1977, Ser. No. 861,189.

In the present video game each line has a fixed number of 128 resolution elements or data bits. A read only memory (ROM) 23 stores the absolute starting and preferred stopping locations, relative to the output of a 12 MHz horizontal counter of the sync circuit forming the horizontal window (see FIG. 3A also) for each horizontal line. The address of the specific horizontal line which is being scanned is provided on line 24 by the vertical line counter 57 of the sync circuit. Video window data consisting of the starting and stopping positions of the window on each horizontal line is outputed on 8 bit bus 26 to a comparator 27 which has as its second input the horizontal position information of the television display via an 8 bit input from the horizontal scan counter. The ninth or most significant bit (MSB) controls ROM 23 since this bit is zero for the start position and changes to "1" after 255 to provide for a readout of the stop position. Such information provides 512 resolution elements as indicated in FIG. 3A because of the output line 28 a window signal such as shown in FIG. 3A is produced which activates flip-flop 29. The flip-flop in conjunction with the comparator 27 actually forms the physical window signal of 3A and this is used to initiate the counting of a counter 31 which has a capacity or full count of 128 counts. The time to count to 128 and the logical inverse of that, also illustrated in FIGS. 3B and 3C, are produced. The counter is clocked by a feedback line 32 from the VCO clock output 22 of voltage controlled oscillator 21.

The control voltage, $V_{in}$, of VCO 21, is provided by the amount of voltage or charge on an integrating capacitor 33. Such capacitor is controllably discharged by a variable current source generally indicated at 34. This source includes an AND gate 36 and NAND gate 37 which are responsive to the count outputs of counter 31 and the window outputs of flip-flop 29. AND gate 36 provides a charging current to capacitor 33 through diode 38 and resistor 40 (the circuit being necessarily simplified) and NAND gate 37 provides a discharge path through diode 42 and resistor 43.

It is apparent that the foregoing circuitry provides a type of feedback loop so that the voltage controlled oscillator 21 will vary its VCO clock in accordance with the size of the desired window determined by comparator 27 and flip-flop 29. Moreover, this feedback circuit is effectively a sampled phase locked loop. The sample is taken once per horizontal line in order to provide an error correction voltage or specifically a correction in the amount of voltage on capacitor 33. The operation is illustrated by FIGS. 3A, 3B and 3C where if the VCO clock on line 22 is at too high a frequency to therefore produce a count of 128 early or before the stop indication of the window the capacitor is charged to greater value to slow the clock rate; on the other hand as illustrated in FIG. 3C too slow a VCO clock rate will cause the count to be late and thus the NAND gate 37 will discharge capacitor 33 a sufficient amount so the control voltage of $V_{in}$ is adjusted to reduce the error. Thus the phase locked loop control tends to make the time of the full count of counter 31 coincide with the stopping point of the window.

It should be noted that the VCO will always produce 128 clocks; thus all 128 effective resolution elements of each line of the video image are always displayed. During vertical retrace flip-flop 29 is activated or reset by a $V_{blank}$ signal which produces in essence a very long "window" signal which causes the charging circuit to fully recharge capacitor 33. Thus at the beginning of the next scan, referring to FIG. 1B, where the longest line width or lowest VCO clock rate is desired, the circuit has been preconditioned to accomplish this.

Referring now to ROM 23 each horizontal line is assigned in advance its predetermined video window which consists of a certain portion of a line. In general this is in order to form converging perspective lines 14 and 15 shown in FIGS. 1A and 1B. However, in order to correct the hourglass effect shown by dashed lines 14' and 15' produced by distortion in the vertical drive the starting and stopping addresses of the other lines are adjusted accordingly to eliminate the distortion. In other words, a predistortion is introduced.

Referring now to the remainder of the block diagram of FIG. 2, this illustrates how the actual video image is produced in eight colors or eight shades of gray using a minimum of data bits for each line. A typical line, of course, has already been illustrated in FIG. 1C. Comparing such line to the storage of a graphics ROM 46 this ROM contains for each of 128 horizontal lines 16 eight bit bytes each byte representing a line segment to be displayed (each line is displayed twice each frame). One portion of this eight bit byte is outputed on bus 47 which is a three bit bus to determine the color of the line segment or one of eight levels of gray. A color decode unit 48 converts the binary data to the proper video which effectively drives the chroma circuit in the video display unit. A five bit output bus 49 of ROM 46 determines the length of the segment. Because it is five bits this means that 1 to 32 bits or resolution elements of the final video display may be determined. Of course, when the ROM 46 is initially programmed, it is ensured that the summation of the total lengths is equivalent to 128 data bits or resolution elements of a horizontal line.

Graphics ROM 46 via the bus 49 initially sets a horizontal counter 41 to the number of data bits in a particular segment. The rate at which the counter is counted down to zero are determined by the clock or frequency input from VCO 21. A completion of the countdown is sensed by a gate 52 which has as its other input a logical inverse of count 128 from start counter 31 which ensures that the gate has no output except during an actual window. The output 53 of gate 52 clocks a horizontal segment or color byte counter 54 which counts 0 through 15 when incremented. Its output bus 56 accesses the next byte of the line stored in graphics ROM 46. At the same time the clocking output on line 53 also clocks color decode unit 48 to cause it to decode the next color data output on bus 47.

To provide the proper line of video data a vertical counter 57 receives the starting address from microprocessor unit 24 to select the proper starting line address. A slipping counter (incremented every other line) type of effect is provided in order to achieve the vertical motion desired between FIGS. 1A and 1B. This is effectively illustrated by Bushnell U.S. Pat. No. 3,793,483.

FIG. 4A illustrates the vertical drive circuitry for modifying the spacing between horizontal lines; that is, at the beginning of the scan providing a large spacing and at the end a condensed spacing. It should be kept in mind that there will still be 240 horizontal lines on the display screen at any given time (120 lines doubled) and that producing a nonlinearity in the drive voltage merely changes the effective position of the electron beam as the horizontal sync produces successive scans.

A typical vertical drive voltage is illustrated in FIG. 4B where there is a gradual and linear rise throughout the frame time of 16.6 milliseconds and then a flyback portion 61. FIG. 4C shows the new vertical drive voltage which modifies the substantially linear curve of FIG. 4B to a substantially nonlinear concave curve. The beam as indicated by the dashed line 62 moves more quickly at the beginning of the scan to thus produce wider spacing and more slowly as shown by dashed line 63 at the end of the scan. The average rate is, of course, the same as in FIG. 4B and thus 240 lines are still displayed.

The circuit to produce the curve of FIG. 4C is illustrated in FIG. 4A and is a standard vertical oscillator circuit for a typical black and white television monitor except for the change illustrated by the dashed block 64 marked "new." Referring briefly to the standard part of the circuit, the ramp generator is a simple capacitor charging circuit which includes the capacitors 66 and 67 which are charged from a voltage source much greater than the threshold voltage (e.g., 75 volts) through the impedance unit 64. The time constant of the RC charging circuit is much larger than the time for one frame indicated by the dashed line 68 of FIG. 4B in order to provide for operation on a linear part of the charging curve. Capacitors 66 and 67 are charged up to the threshold level. Threshold detector unit 69 senses this level (e.g. 5 volts) and causes the flyback discharge 61. In order to provide absolute linearity the feedback circuit 71 is provided on commercial television models which is an adjustable RC matrix which effectively provides a positive feedback thus producing a slightly convex curve.

Now in accordance with the present invention, the modification shown in dashed block 64 effectively lowers the applied charge voltage to thereby move the horizontal asymptote 72 (see FIG. 4B) closer to the threshold voltage region; that is, 5 volts. This forces the operating range into the nonlinear region of the curve to thus produce the concave waveform. It is apparent that this concave effect is easily produced by exchanging the single resistor of the "old" with the two resistors and capacitor as shown. To produce the opposite or convex shape would require unstable positive feedback techniques as implied by the linearity adjustment circuit of FIG. 4A.

It is obvious from examination of the curve of FIG. 4C that at the beginning of the scan the horizontal lines are spaced further apart than at the end. Thus, it is necessary to invert the entire video image (see FIG. 1D and the use of the mirror) to provide the proper simulation of a perspective view with lines converging into the distance at the top of the image.

Thus the present invention has provided an improved technique of simulating a perspective on a video display screen and in addition, provides such image with the use of a minimum number of data bits.

What is claimed is:

1. Apparatus for simulating a perspective view of an image composed of several horizontal lines on a raster scan type video display screen, such screen having top and bottom ends, comprising: means for gradually reducing the line width of each horizontal line of said image from one end of such image to the other end; and means for gradually reducing the spacing between each horizontal line of said image from one end of such image to the other end.

2. Apparatus as in claim 1 where said means for reducing said line widths of said image includes, memory means for providing a predetermined number of data bits for each line of said image and variable oscillator means for varying the rate of readout of said bits to said video display screen in proportion to said line width.

3. Apparatus as in claim 2 including storage means for storing the desired width of each line of said image, means for comparing the actual horizontal scan position of said video display with the starting and stopping points of a line and means responsive to said starting and stopping points for controlling said variable oscillator means accordingly.

4. Apparatus as in claim 3 where said storage means predistorts said desired widths to compensate for distortion produced by said change of spacing between horizontal lines.

5. Apparatus as in claim 3 where said means for controlling said variable oscillator means includes a sampled phase locked loop which samples once per horizontal line comprising integrating capacitor means for storing a voltage for driving such variable oscillator means, variable current source means for charging and discharging said capacitor means, and counter means for counting the output frequency of said oscillator up to said number of stored data bits which is identical for all lines, said variable current source means including means for comparing said full count of counter means and said stopping point for adjusting the voltage on said integrating capacitor and thereby said variable oscillator frequency to cause said stopping point to tend to coincide with said full count of said counter means.

6. Apparatus as in claim 1 where said means for reducing said spacing between horizontal lines includes vertical driver means for producing a vertical drive voltage for said raster scan video display which is substantially nonlinear.

7. Apparatus as in claim 6 where said nonlinearity is a concave characteristic whereby near the beginning of a video frame said lines are spaced further apart compared to the end of such frame.

8. Apparatus as in claim 7 including means for inverting said video image.

9. Apparatus as in claim 1 including means to cause said image to continually move from one end of said screen to the other.

10. Apparatus as in claim 2 where said memory means for providing said predetermined number of data bits for each line stores a predetermined number of bytes each byte representing a line segment and each byte including coded binary data one portion indicating the color or gray scale of such segment and the other portion the length of the segment, the total of said lengths being equivalent to said predetermined number of data bits.

11. Apparatus for generating an image on a raster scan video display screen where such image is composed of several horizontal lines comprising: memory means for providing a predetermined number of data bits for each line of said image, such means storing a predetermined number of bytes, each byte representing a line segment and each byte including coded binary data one portion indicating the color or gray scale of such segment to provide more than two variations and the other portion the length of the segment, the total of said lengths being equivalent to said predetermined number of data bits.

* * * * *